(12) United States Patent
Schneidau et al.

(10) Patent No.: US 7,147,263 B2
(45) Date of Patent: Dec. 12, 2006

(54) GOLF CART SCREEN

(76) Inventors: Tim Schneidau, 154 N. Union St., Alexandria, VA (US) 22314; Matthew Schneidau, 154 N. Union St., Alexandria, VA (US) 22314

( * ) Notice: Subject to any disclaimer, the term of this patent is extended or adjusted under 35 U.S.C. 154(b) by 0 days.

(21) Appl. No.: 10/934,481

(22) Filed: Sep. 7, 2004

(65) Prior Publication Data

US 2006/0049654 A1 Mar. 9, 2006

(51) Int. Cl.
*B60J 1/02* (2006.01)

(52) U.S. Cl. .................... 296/77.1; 296/95.1

(58) Field of Classification Search ............. 296/95.1, 296/77.1
See application file for complete search history.

(56) References Cited

U.S. PATENT DOCUMENTS

| | | | | |
|---|---|---|---|---|
| 1,461,478 A | * | 7/1923 | Daniels | ............ 296/95.1 |
| 1,798,524 A | * | 3/1931 | Di Palma | ............ 296/95.1 |
| 4,819,979 A | * | 4/1989 | Moglia | ............ 296/77.1 |
| 5,121,957 A | * | 6/1992 | O'Shea | ............ 296/1.04 |
| 5,211,214 A | | 5/1993 | Shaw | |
| 5,388,881 A | | 2/1995 | Spenser | |
| 5,429,404 A | | 7/1995 | King | |
| 5,639,524 A | * | 6/1997 | Lin | ............ 428/35.2 |
| 5,788,317 A | | 8/1998 | Nation | |
| 5,984,405 A | * | 11/1999 | Ciacci | ............ 296/218 |
| 6,007,134 A | | 12/1999 | Weston | |
| 6,199,932 B1 | | 3/2001 | Welsh | |
| 6,276,745 B1 | | 8/2001 | Wilson | |
| 6,497,444 B1 | | 12/2002 | Simon | |
| 6,547,312 B1 | | 4/2003 | Winkler | |
| 6,869,125 B1 | * | 3/2005 | Hamm | ............ 296/83 |
| 2002/0084669 A1 | | 7/2002 | Goodstein | |
| 2004/0007894 A1 | | 1/2004 | Hann | |

* cited by examiner

*Primary Examiner*—Joseph D. Pape
(74) *Attorney, Agent, or Firm*—Stanzione & Kim, LLP

(57) ABSTRACT

A screen surrounded by a flexible frame and an attaching mechanism to attach the flexible frame to a front end of a golf cart. The screen is easily mountable and removable on the front end of the golf cart and is flexibly deformable to be stored within a golf bag for easy transportation thereof.

28 Claims, 10 Drawing Sheets

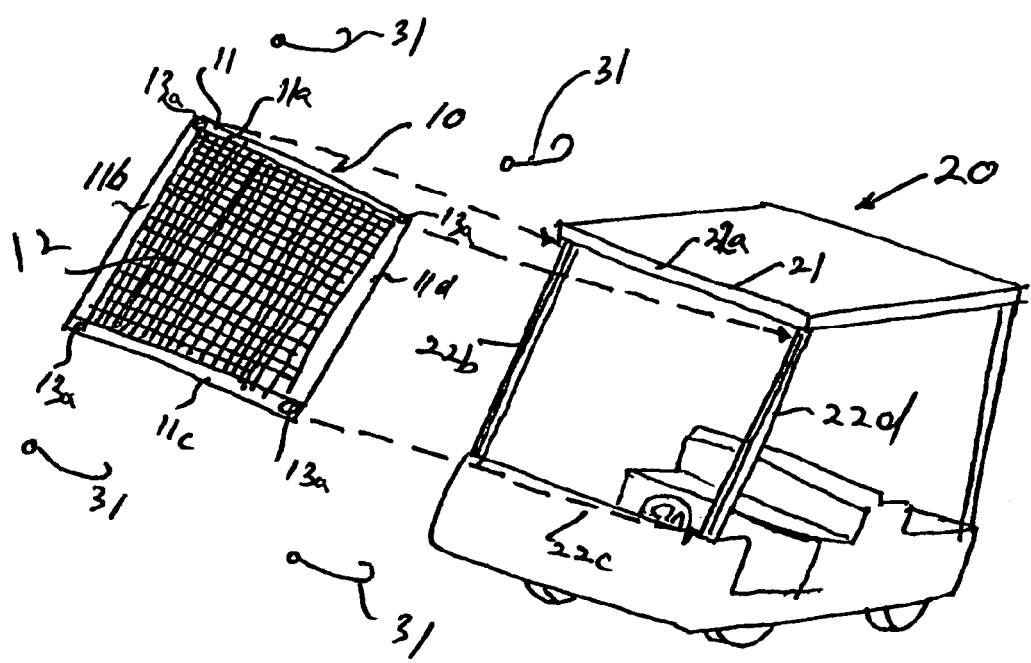

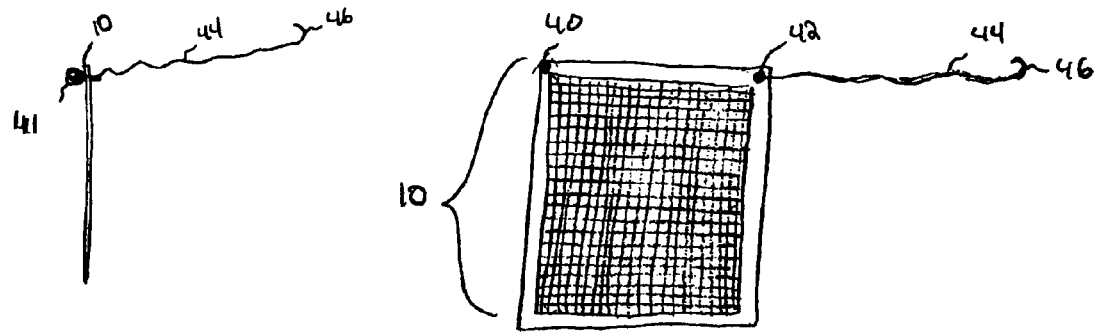
FIG 10A
FIG 10B
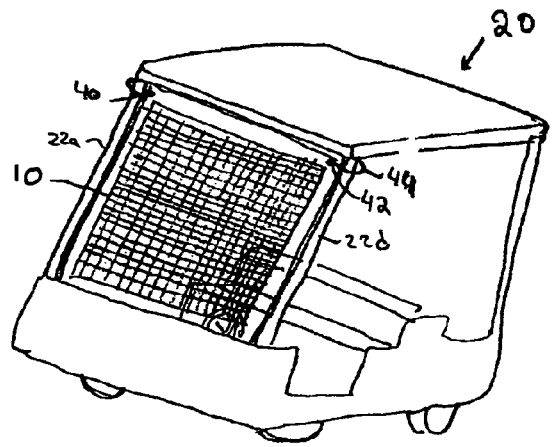
FIG 10C

GOLF CART SCREEN

BACKGROUND

Golf carts typically have a solid transparent windshield in order to protect the rider(s) from bugs and other elements. However, such a windshield prevents the riders from enjoying a breeze while riding.

U.S. Pat. No. 5,211,214 discloses a rigid screen that can be mountable on a front end of a golf cart. However, a disadvantage of this device is that the rigid screen is not easily transportable or easily stored. Another disadvantage of the rigid screen disclosed in U.S. Pat. No. 5,211,214 is that it is not easily mountable and/or removable to and/or from a golf cart.

Another type of golf cart shading system is one disclosed in U.S. Publication No. 2004/0007894 A1. This shading system is used by extending around the sides and back of a golf cart. In order to provide access to golf clubs once the lengthy screen is wrapped around the sides and back end of the cart and attached thereto, slots 128 are formed therein. However, this wrap-around type shading system is large and therefore not easily removable or storable when not in use. Furthermore, a user of a golf cart can not easily carry with him/her such a shading system for applying to a golf cart when desired.

In view of the above problems, there is a need for a screen that is easily mountable at any portion of a golf cart, is easily transportable, and is easily stored when not in use. There is also a need for an easy way for an owner/rider of a golf cart or other similar motorized vehicle to display indicia for marketing, advertising, or for personal identification, on a golf cart or similar type motorized vehicle.

SUMMMARY

It is an aspect of the present general inventive concept to provide an easily mountable and/or removable screen apparatus to and/or from a front or other portion of a golf cart or similar type of motorized vehicle.

It is another aspect of the present general inventive concept to provide a golf cart screen that can be easily stored in a golf bag or other type of easily carried storage bag, and removed therefrom to be easily mounted to a golf cart or other similar type motorized vehicle upon using the same.

The above and/or other aspects and advantages of the present general inventive concept can be obtained by providing a flexible golf cart screen including a flexible reinforcement surrounding a border of the screen to attach the screen to a front or other portion of a golf cart or other similar type motorized vehicle.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 illustrates the three-dimensional mountable/removable flexible golf cart screen of FIG. 1 in a state in which it is being mounted to a golf cart;

FIG. 10A is a top view of the flexible golf cart screen with a bungee cord securer, according to an embodiment of the present general inventive concept;

FIG. 10B is a front view of the flexible golf cart screen with a bungee cord securer, according to an embodiment of the present general inventive concept; and FIG. 10C is a perspective view of a golf cart attached to the flexible golf cart screen using a bungee cord securer, according to an embodiment of the present general inventive concept.

DETAILED DESCRIPTION OF THE PRESENT GENERAL INVENTIVE CONCEPT

Figure 1:
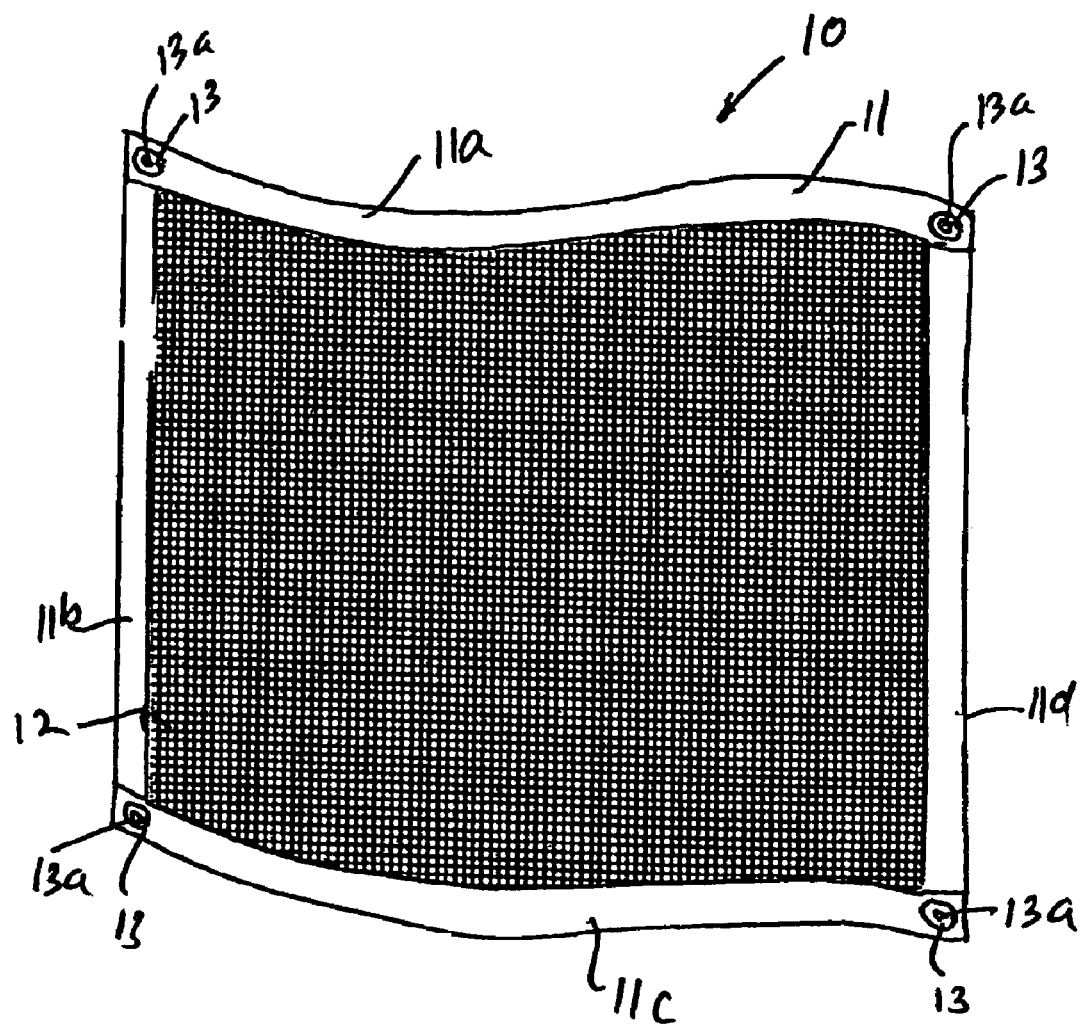
FIG. 1 illustrates an exemplary three-dimensional view of a mountable/removable flexible golf cart screen, according to an embodiment of the present general inventive concept.

Reference will now be made in detail to the present preferred embodiments of the general inventive concept, examples of which are illustrated in the accompanying drawings, wherein like reference numerals refer to like elements throughout.

FIG. 1 illustrates an exemplary three-dimensional view of a mountable/removable flexible golf cart screen, according to an embodiment of the present general inventive concept.

A flexible screen apparatus 10 is easily and removably mountable on a front of a golf cart or other similar type motorized vehicle in order to protect riders from bugs and other elements as well as providing shading. Because the flexible screen apparatus 10 is removably attachable, it is easily attached and removed to and/or from the golf cart by using fastening mechanisms which do not require much effort. As can be seen in FIG. 1, the flexible screen apparatus 10 can be bent, rolled up or flexed in any direction, and thus can be rolled up and/or folded to be taken with the user when the golf cart is no longer needed, and can be stored within a golf bag used to carry golf clubs such that the flexible screen available for applying to another golf cart when required.

Referring to the flexible screen apparatus 10, a screen 12 is surrounded by a flexible reinforcement 11. The screen 12 can be made of a nylon or wire mesh, although other similar materials can be used as well, which do not obstruct the view of the user when operating the golf cart. The flexible reinforcement 11 can have a top side 11a, a left side 11b, a bottom side 11c, and a right side 11d. The flexible reinforcement 11 can either be made by applying the respective portions of the screen 12 with a reinforcing material, such as a nylon material, or can be applied in the form of a rubber material.

A plurality of supports 13 having holes 13a therein can be provided at each of several corners of the flexible reinforcement 11. The holes 13a can be circular and the supports 13 can also be circular to coincide with the holes 13a. Alternatively, other shapes may be used for the supports 13 and the holes 13a.

Figure 2:
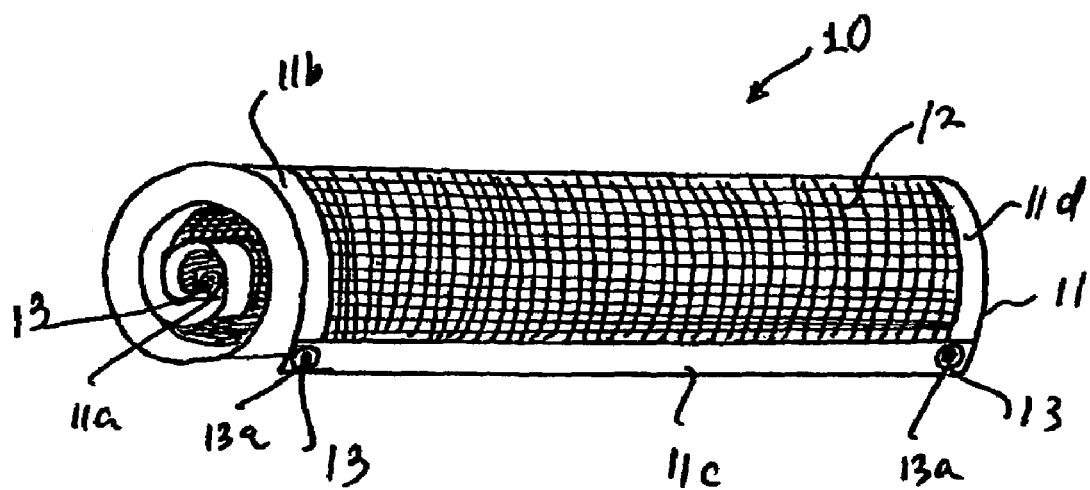
FIG. 2 illustrates the three-dimensional mountable/removable flexible golf cart screen of FIG. 1 in a rolled up and storable state.

FIG. 2 illustrates the three-dimensional mountable/flexible golf cart screen of FIG. 1 in a rolled up and storable state.

With the flexibility of the golf cart screen of FIG. 1, as illustrated in FIG. 2, transportation and storage thereof can be easily facilitated. Thus, a golfer can keep the golf cart screen in a usable proximity by only carrying a golf bag, as usual, and can apply the golf cart screen to any golf cart the golfer happens to be renting on any particular golf outing.

FIG. 3 illustrates the three-dimensional mountable/removable flexible golf cart screen of FG. 1 being mounted to a golf cart or other similar type motorized vehicle.

Referring to FIG. 3, a golf cart 20 usually includes a roof 21, a front upper panel 22a, a left roof support panel 22b, a front lower panel 22c, and a right roof support panel 22d. As illustrated in FIG. 3, the top side 11a of the flexible reinforcement 11 can be aligned with the front upper panel 22a, the left side 11b can be aligned with the left roof support panel 22b, the bottom side 11c can be aligned with the front lower panel 22c, and the right side 11d can be aligned with the right roof support panel 22d. Once each of the parts of the flexible reinforcement is aligned with the corresponding panels of the golf cart, the golf cart screen 10 can be mounted to the golf cart by using fasteners, such as fasteners 31. The fasteners 31 can be slid through the holes 13a, wrapped around the nearest panel of the golf cart and secured to itself to secure the screen to the golf cart 20. More specifically, each of the plurality of fasteners 31 can be inserted through the respective hole 13a and can be secured to respective panels to mount the flexible screen apparatus 10 to the golf cart 20.

Figure 4A:
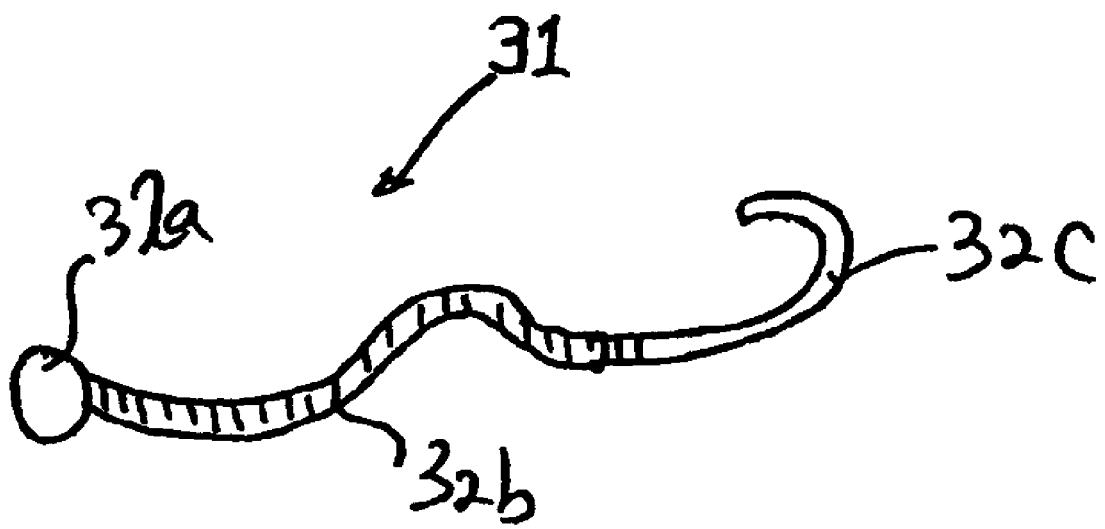
FIG. 4A illustrates an exemplary fastening device used to mount the flexible golf cart screen of FIG. 1, according to an embodiment of the present general inventive concept.

FIG. 4A illustrates an exemplary fastening device used to mount the flexible golf cart screen of FIG. 1, according to an embodiment of the present general inventive concept.

The fastener 31 can include a flexible middle part 32b with a rigid curved end 32c (or hook) on a first end thereof. A head 32a of the fastener 31 can be located at a second end thereof. The curved end 32c can be inserted into one of the holes 13a in the flexible reinforcement 11, pulled securely, and then hooked around the middle part 32b to removably secure the flexible screen apparatus 10 to the golf cart 20.

Figure 4B:
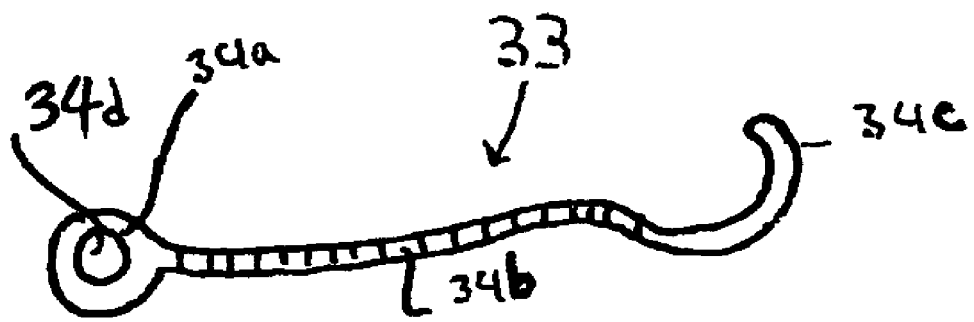
FIG. 4B illustrates another exemplary fastening device used to mount the flexible golf cart, according to an embodiment of the present general inventive concept.

FIG. 4B illustrates another fastener 33 used to mount the flexible golf cart, according to another embodiment of the present general inventive concept.

The fastener 33 can include a middle part 34b attached to a rigid curved end 34c (or hook) on a first end thereof. A hollow head 34a with a hole 34d therein can be located at a second end of the fastener 33. The curved end 34c can be inserted through one of the holes 13a in the flexible reinforcement 11 and then hooked around the middle part 34b to removably secure the flexible screen apparatus 10 to the golf cart 20. Alternatively, the curved end 34c can be inserted into the hole 34d in the hollow head 34a to fasten the screen 10 to a respective golf cart panel 22a–22d illustrated in FIG. 3. The hollow head 34a should typically be large enough not to pass through the hole 13a in the flexible screen apparatus 10. Four such fasteners can be used to secure the flexible screen apparatus to the golf cart 20, although any other number of fasteners can be used alternatively.

Figure 5:
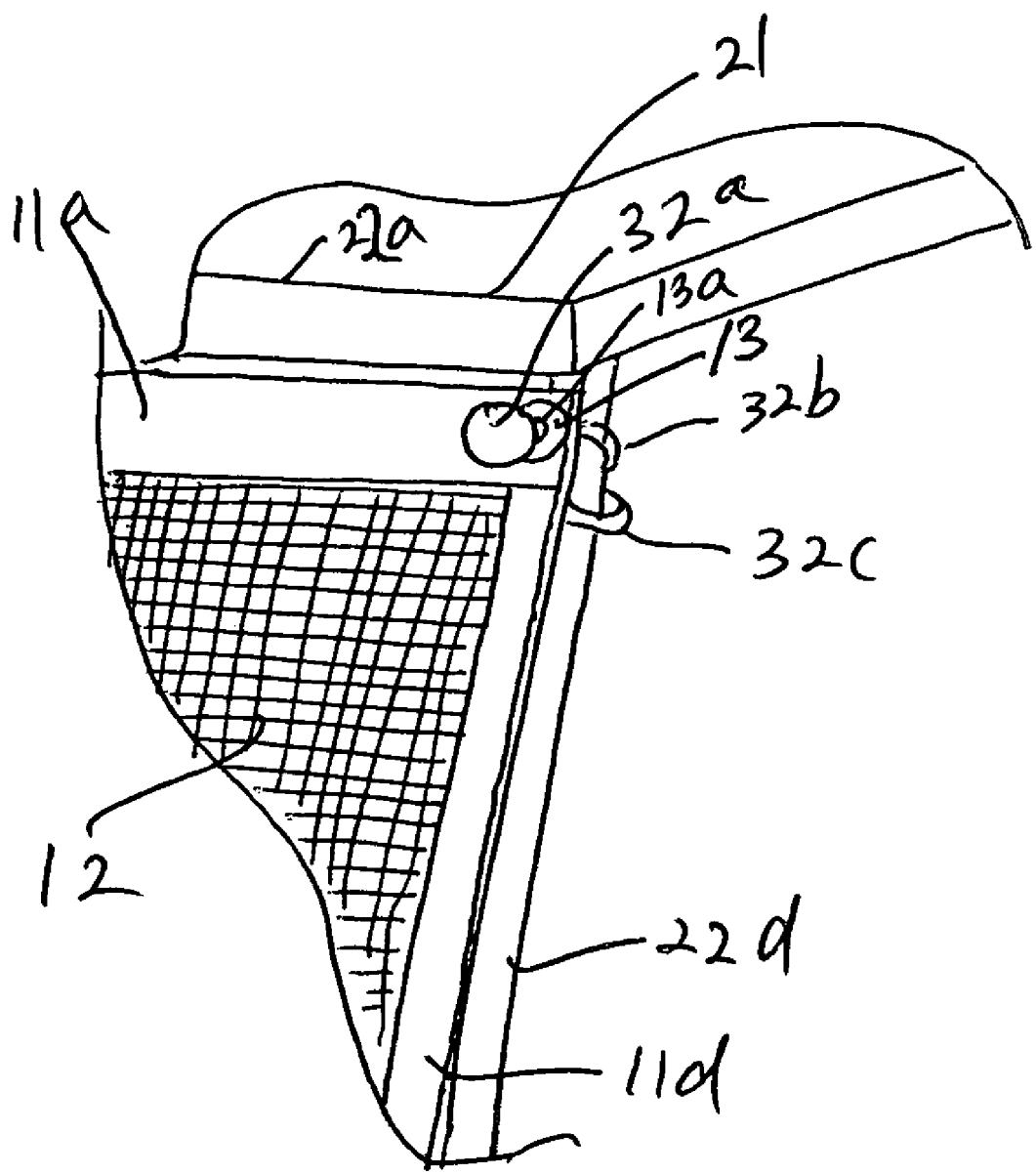
FIG. 5 illustrates the flexible golf cart screen in a state in which it is mounted on a front end of a golf cart by using the fastening device of FIG. 4A.

FIG. 5 illustrates the flexible golf cart screen 10 in a state in which it is mounted on a front end of a golf cart 20 by using the fastener 31 of FIG. 4A.

In FIG. 5, the flexible screen apparatus 10 is mounted onto the golf cart 20 (on one corner) by using the fastener 31 described above. The head 32a is typically larger than the hole 13a so that the head 32a cannot pass through the hole 13a. The middle part 32b can be wrapped around the right roof support panel 22d (although the front upper panel 22a could be used as well in this example). The curved end 32c of the fastener 31 can be tied to the right roof support panel 22d by making a knot in the middle part 32b. Alternatively, the curved end 32c can be linked with a hook (not illustrated) provided on the right panel 22. It is also to be noted that alternative designs of the fastener 31 or 33 can be provided which accomplishes the intended purpose of connecting the golf cart screen 10 to a golf cart 20 or similar type of motorized vehicle.

The curved end 32c of the fastener 31 can be tied around the right roof support panel 22d or the front upper panel 22a.

Figure 6:
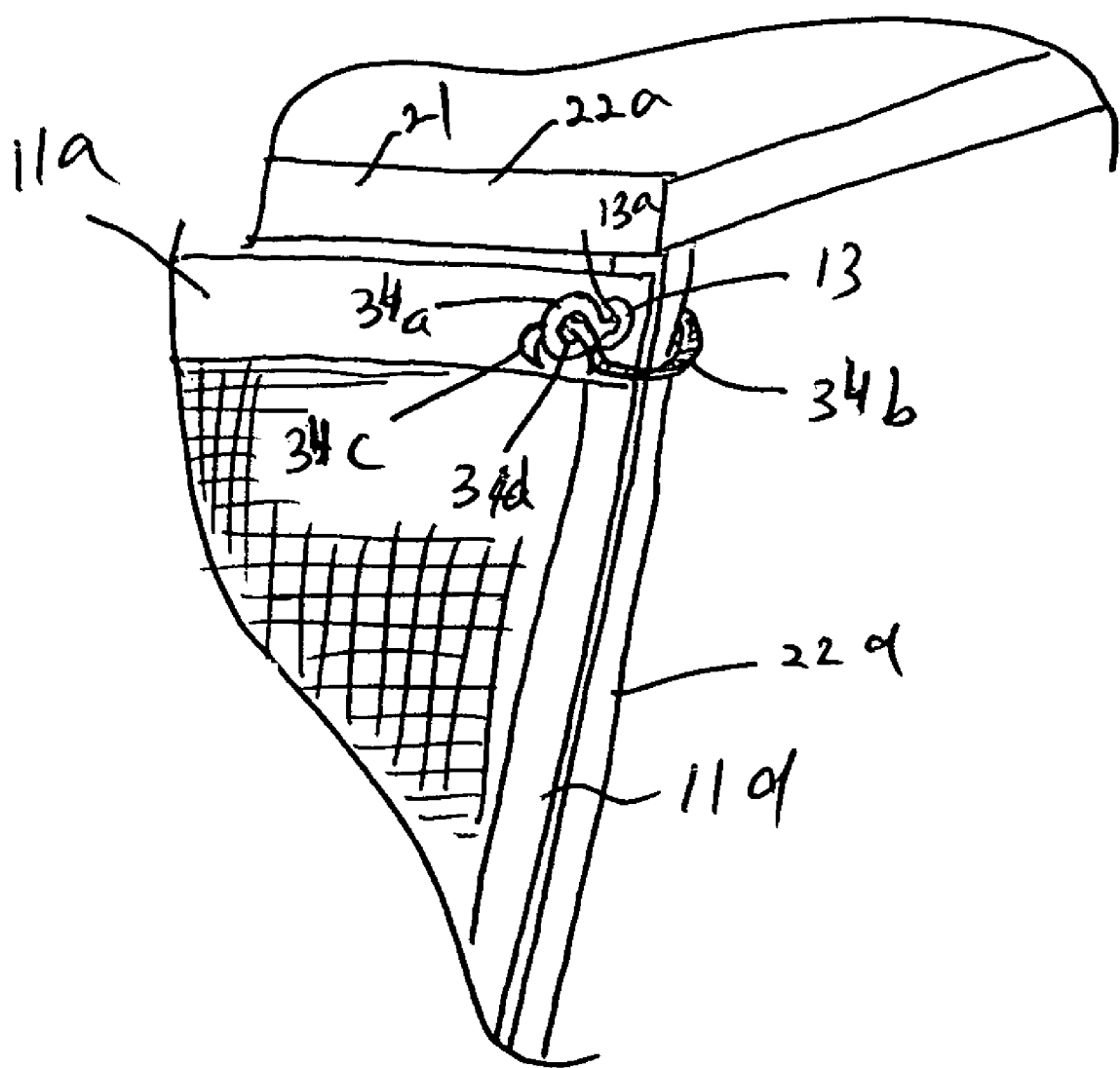
FIG. 6 illustrates the flexible golf cart screen in a state in which it is mounted on a front end of a golf cart by using the fastening device of FIG. 4B.

FIG. 6 illustrates the flexible golf cart screen 10 which is mounted on the front end of the golf cart by using the fastener 33 of FIG. 4B.

In FIG. 6, the flexible screen apparatus 10 is mounted to the golf cart 20 (on one corner) by using the fastener 33 described above. The head 34a is larger than the hole 13a in the flexible reinforcement 11 so that the head 34a cannot pass through the hole 13a. The middle part 34b of the fastener 33 can be wrapped around the right roof support panel 22d (although the front upper panel 22a could be used as well in this example). The curved end 34c of the fastener 33 can be inserted into the hole 34d in the head 34a. The curved end 34c can then be inserted into the hole 34d of the hollow head 34a to be secured thereto.

Figure 7:
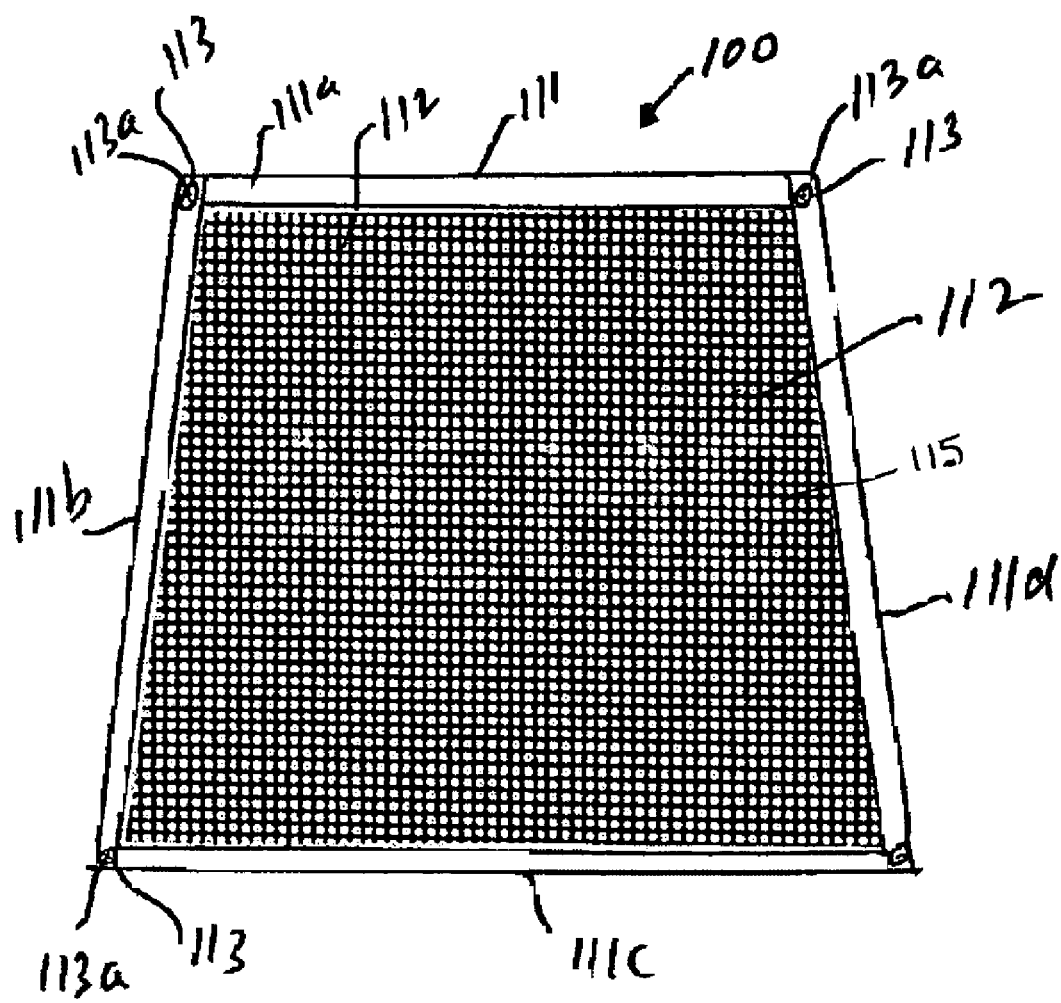
FIG. 7 illustrates an exemplary front view of a flexible golf cart screen, according to another embodiment of the present general inventive concept.

FIG. 7 illustrates an exemplary front view of a flexible golf cart screen, according to another embodiment of the present general inventive concept.

Referring to the golf cart screen 100 of FIG. 7, indicia 115 (i.e., "ACME" or any other type of advertisement, identification or marketing text) can optionally be provided on the flexible screen apparatus 100. The operator of the golf cart can choose any type of indicia, for example, a product to be promoted, a company to be advertised, etc., to be placed on the front of the golf cart by simply attaching the golf cart screen 100 to the golf cart. Because the flexible screen apparatus 100 is easy to transport and store, golf cart operators may possess multiple flexible screen apparatuses, each with different indicia.

Figure 8:
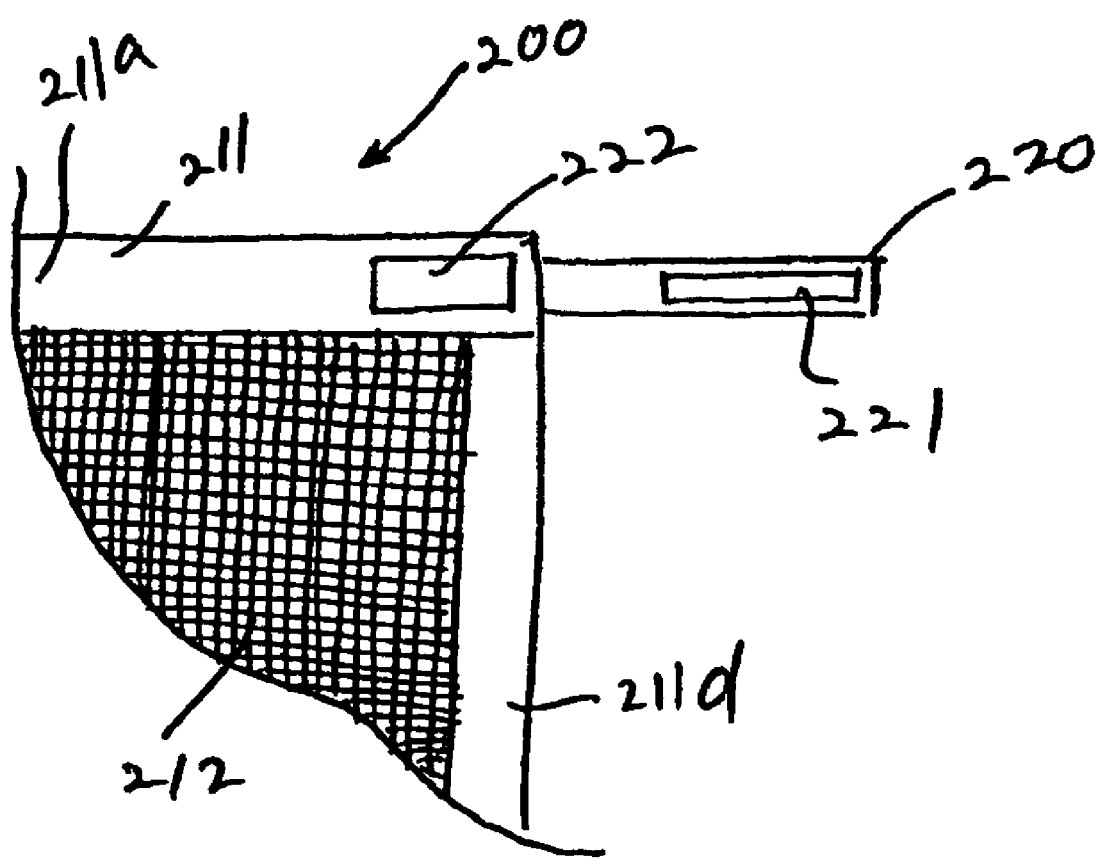
FIG. 8 illustrates an exemplary front view of a Velcro ready flexible golf cart screen fastening device, according to another embodiment of the present general inventive concept.

FIG. 8 illustrates an exemplary front view of a Velcro ready flexible golf cart screen apparatus and a fastening device, according to an embodiment of the present general inventive concept.

Referring to FIG. 8, a Velcro ready flexible screen 200 is similar to the flexible screen 10 described supra, but is adapted to be fastened to the golf cart 20 using a Velcro strap. The Velcro ready flexible screen 200 includes a Velcro ready flexible reinforcement 211 surrounding a screen 212. The Velcro ready flexible reinforcement 211 can have a top side 211a, a right side 211d, and a bottom side (not illustrated) and a left side (not illustrated). The Velcro ready flexible reinforcement 211 includes at least one reinforcement Velcro strip 222 affixed to the Velcro ready flexible reinforcement 211. A fastening Velcro strip 221 is affixed to a first end of a fastener 220. The fastening Velcro strip 221 bonds with the reinforcement Velcro strip 222 to secure the fastener 220 to the Velcro ready flexible reinforcement 211. A second end of the fastener 220 can be attached to the Velcro ready flexible reinforcement 211 and can wrap around a panel (such as the front upper panel 22a or the right panel 22d). The second end of the fastener 220 can also be removable from the Velcro ready flexible reinforcement 211 and can include an additional Velcro strip (not pictured) which also bonds to an additional Velcro strip (not pictured) on an opposite side of the Velcro ready flexible reinforcement from where the Velcro strip 222 is.

Figure 9:
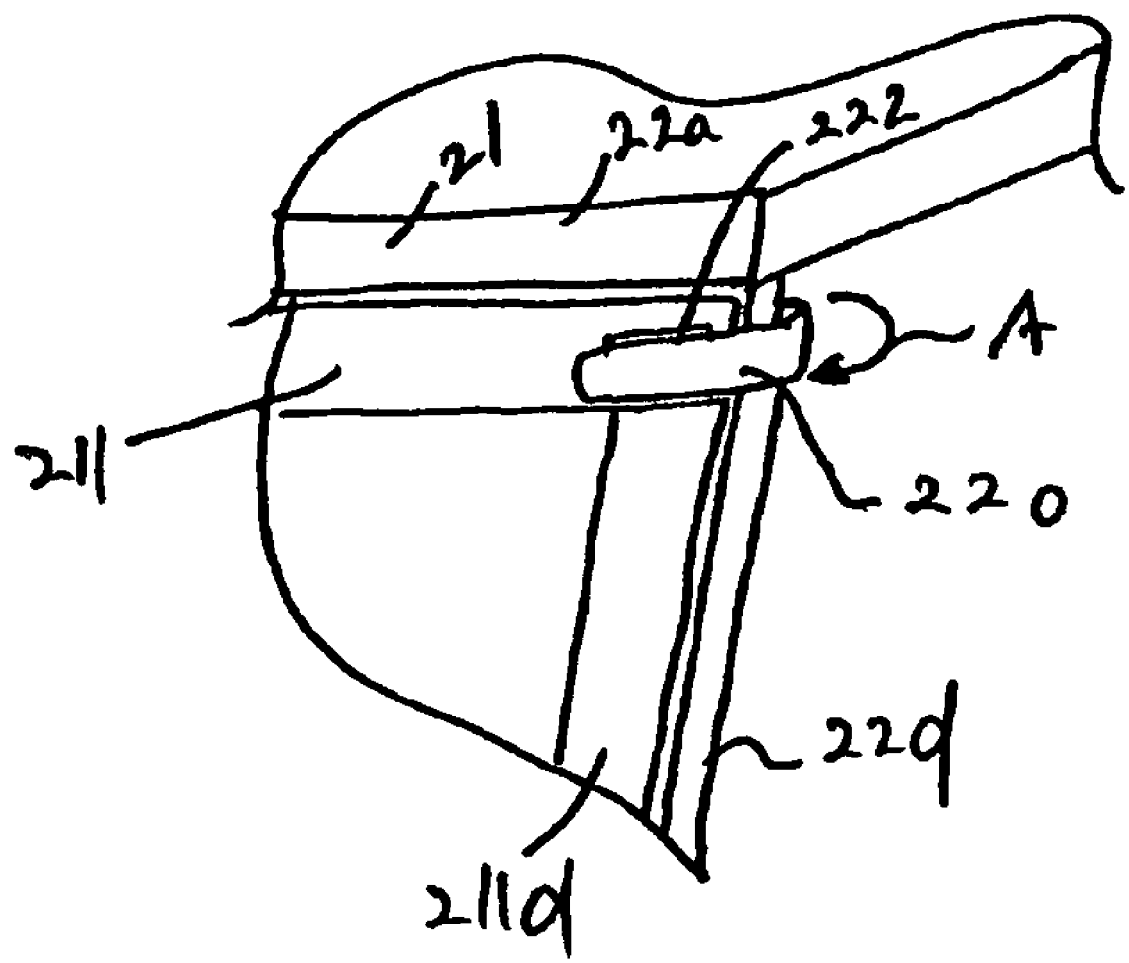
FIG. 9 illustrates the Velcro ready flexible golf cart screen of FIG. 8 in a state in which it is fastened to a golf cart.

FIG. 9 illustrates the Velcro ready flexible golf cart screen in a state in which it is fastened at one end to a golf cart. The fastening Velcro strip 221 (see FIG. 8) on the fastener 220 bonds to the reinforcement Velcro strip 222 on the Velcro ready flexible reinforcement 211, thereby securing the Velcro ready flexible reinforcement 211 to the right roof support panel 22d.

An additional Velcro strip (not illustrated) can also be provided on the front upper panel 22a on the side opposite to the panel 22d of the golf cart 20. Thus, the fastener 220 can include two Velcro strips on opposite ends and each opposite end can bond onto both the Velcro strip 222 and the additional Velcro strip (not pictured), respectively. The end of the fastener 220 not attached to the Velcro ready flexible reinforcement 211 can be attached to the right roof support panel 22d (or any other appropriate panel) through any other attachment mechanism, such as snaps, etc.

Similarly, the top side 11a of the flexible reinforcement can be attached to the front upper panel 22a, the left side 11b can be attached to the left roof support panel 22b, the bottom side 11c can be attached to the front lower panel 22c, and the right side 11d can be attached to the right roof support panel 22d.

The end of the fastener 220 not attached to the Velcro ready flexible reinforcement 211 can also be attached to the roof 21 instead of the right roof support panel 22d.

In yet a further embodiment of the present general inventive concept, the flexible golf cart screen 10 can be attached to the golf cart 20 using a single bungee securer (a bungee cord) that wraps around the left roof support panel 22b and the right roof support panel 22d.

FIG. 10A is a top view of the flexible golf cart screen with a bungee cord securer, according to an embodiment of the present general inventive concept. The bungee cord securer 44 passes through a hole in the flexible golf cart screen 10. A knot 41 tied on a first end of the bungee cord securer 44 prevents the bungee cord securer 44 from being pulled through the hole. An optional hook 46 can be attached to a second end of the bungee cord securer 44.

FIG. 10B is a front view of the flexible golf cart screen with a bungee cord securer, according to an embodiment of the present general inventive concept. The bungee cord securer 44 has a knot (not pictured) on a first end which prevents the bungee cord securer from being pulled through the top right hole 42. A top left hole 40 can be used to receive the hook 46. Alternatively, the bungee cord securer can be permanently affixed to the flexible golf cart screen.

FIG. 10C is a perspective view of a golf cart attached to the flexible golf cart screen using a bungee cord securer, according to an embodiment of the present general inventive concept. The bungee cord securer 44 wraps around the right roof support panel 22d and the left roof support panel 22a to secure the flexible golf cart screen 10 onto the golf cart 20. The hook 44 can be inserted into the left hole 40 to secure the flexible golf cart screen 10. A knot (not pictured) tied on a first end of the bungee cord securer 44 prevents the bungee cord securer 44 from being pulled through the top right hole 44.

Alternatively, instead of using the hook 46, the second end of the bungee cord securer 44 can be tied into a knot on a farther side (as opposed to the visible closer side) of the flexible golf cart screen 10 to secure the flexible golf cart screen 10. The second end of the bungee cord securer 44 can also be tied onto the left roof support panel 22a.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The various embodiments are intended to be protected broadly within the spirit and scope of the appended claims.

What is claimed is:

1. A flexible golf cart screen apparatus, comprising:
   a screen surrounded by a flexible reinforcement; and
   at least one attaching mechanism disposed on the flexible reinforcement to removably attach the flexible reinforcement to a golf cart,
   wherein the screen is attachable to the golf cart in an opening in a golf cart front panel formed by a front upper panel, a front lower panel, a first roof support panel, and a second roof support panel, and the at least one attaching mechanism is attachable around at least one of the first and second roof support panels.

2. The flexible golf cart screen apparatus as recited in claim 1, wherein the flexible reinforcement attaches to a front of the golf cart.

3. The flexible golf cart screen apparatus as recited in claim 1, wherein the at least one attaching mechanism comprises:
   a first hole in the flexible reinforcement; and
   a connector insertable into the first hole and fastenable to the golf cart.

4. The flexible golf cart screen apparatus as recited in claim 3, wherein the at least one attaching mechanism is positioned at a corner of the flexible reinforcement.

5. The flexible golf cart screen apparatus as recited in claim 4, further comprising three additional holes, each hole being positioned at a different corner of the flexible reinforcement with respect to each other.

6. The flexible golf cart screen apparatus as recited in claim 1, wherein the attaching mechanism comprises:
   a connector including a VELCRO strip on a first end; and
   a VELCRO receiving strip on the flexible reinforcement to connect with the VELCRO strip.

7. The flexible golf cart screen apparatus as recited in claim 1, wherein the attaching mechanism is a connector comprising:
   a middle portion;
   a first end with a hollow head provided at one end of the middle portion; and
   a second end positioned at another end of the middle portion.

8. The flexible golf cart screen apparatus as recited in claim 7, wherein the second end loops around a panel on the golf cart and connects with the hollow head to secure the flexible reinforcement to the panel.

9. The flexible golf cart screen apparatus as recited in claim 1, wherein the screen comprises indicia embedded within the screen.

10. The flexible golf cart screen apparatus as recited in claim 1, wherein the screen rolls up into a tube-like shape.

11. The flexible golf cart screen apparatus as recited in claim 1, wherein the screen folds up into a fraction of its fully opened position.

12. The flexible golf cart screen apparatus as recited in claim 1, wherein the attaching mechanism is a bungee cord connected to a first end of the flexible reinforcement and wrapping around the golf cart to connect to a second end of the flexible reinforcement.

13. The flexible golf cart screen apparatus as recited in claim 1, wherein the at least one attaching mechanism comprises a plurality of attaching mechanisms separately extending from the flexible reinforcement.

14. The flexible golf cart screen apparatus as recited in claim 1, wherein the screen comprises a see-through mesh.

15. A flexible golf cart screen apparatus, comprising:
a screen surrounded by a flexible reinforcement; and
four attaching mechanisms, each attaching mechanism disposed on the flexible reinforcement and positioned in a respective corner thereof to removably attach to a golf cart,
wherein the screen is attachable to the golf cart in an opening in a golf cart front panel formed by a front upper panel, a front lower panel, a first roof support panel, and a second roof support panel, and the four attaching mechanisms are attachable around the first and second roof support panels.

16. The flexible golf cart screen apparatus as recited in claim 15, the flexible reinforcement attaches to a front side of the golf cart.

17. The flexible golf cart screen apparatus as recited in claim 15, wherein the screen contains indicia embedded therein.

18. The flexible golf cart screen apparatus as recited in claim 15, wherein the flexible reinforcement is made of nylon.

19. The flexible golf cart screen apparatus as recited in claim 15, wherein the four attaching mechanisms separately extend from the flexible reinforcement.

20. The flexible golf cart screen apparatus as recited in claim 15, wherein the screen comprises a see through mesh.

21. A flexible golf cart screen apparatus, comprising:
a flexible shading means surrounded by a flexible reinforcement; and
a removable attaching means disposed on the flexible reinforcement for removably attaching the golf cart screen to a golf cart,
wherein the flexible shading means is attachable to the golf cart in an opening in a golf cart front panel formed by a front upper panel, a front lower panel, a first roof support panel, and a second roof support panel, and the removable attaching means is attachable around at least one of the first and second roof support panels.

22. The flexible golf cart screen apparatus as recited in claim 21, wherein the removable attaching means comprises a plurality of attaching mechanisms separately extending from the flexible reinforcement.

23. The flexible golf cart screen apparatus as recited in claim 21, wherein the flexible shading means comprises a see through mesh screen.

24. A deflecting screen used with a golf cart, comprising:
a flexible see-through deflecting member surrounded by a flexible reinforcement; and
at least one attaching mechanism disposed on the flexible see-through deflecting member to removably attach the flexible see-through deflecting member to a golf cart to deflect dust and insects while the golf cart is being operated,
wherein the flexible see-through deflecting member is attachable to the golf cart in an opening in a golf cart front panel formed by a front upper panel, a front lower panel, a first roof support panel, and a second roof support panel, and the at least one attaching mechanism is attachable around at least one of the first and second roof support panels.

25. The deflecting screen as recited in claim 24, wherein the flexible see-through deflecting member comprises a mesh, and the flexible reinforcement comprises a nylon border surrounding the mesh to provide flexibility and strength to the mesh.

26. The deflecting screen as recited in claim 25, wherein the at least one attaching mechanism comprises four flexible straps that attach to the nylon border at one end and to a frame of the golf cart at a second end to fasten the deflecting screen to any desired position of the golf cart.

27. The deflecting screen as recited in claim 25, wherein the attaching mechanism comprises a bungee cord connected to a first top end of the deflecting member and wrapping around the golf cart to connect to a second top end of the deflecting member.

28. The defecting screen as recited in claim 24, wherein the at least one attaching mechanism comprises a plurality of attaching mechanisms separately extending from the flexible reinforcement.

* * * * *